Feb. 2, 1960  R. M. M. OBERMAN  2,923,883
APPARATUS FOR DETERMINING THE PHASE OF AN A.C. VOLTAGE
WHICH CAN OCCUR IN 12 DIFFERENT PHASES HAVING
CONSECUTIVE SHIFTS OF 30 DEGREES
Filed June 21, 1954  2 Sheets-Sheet 1
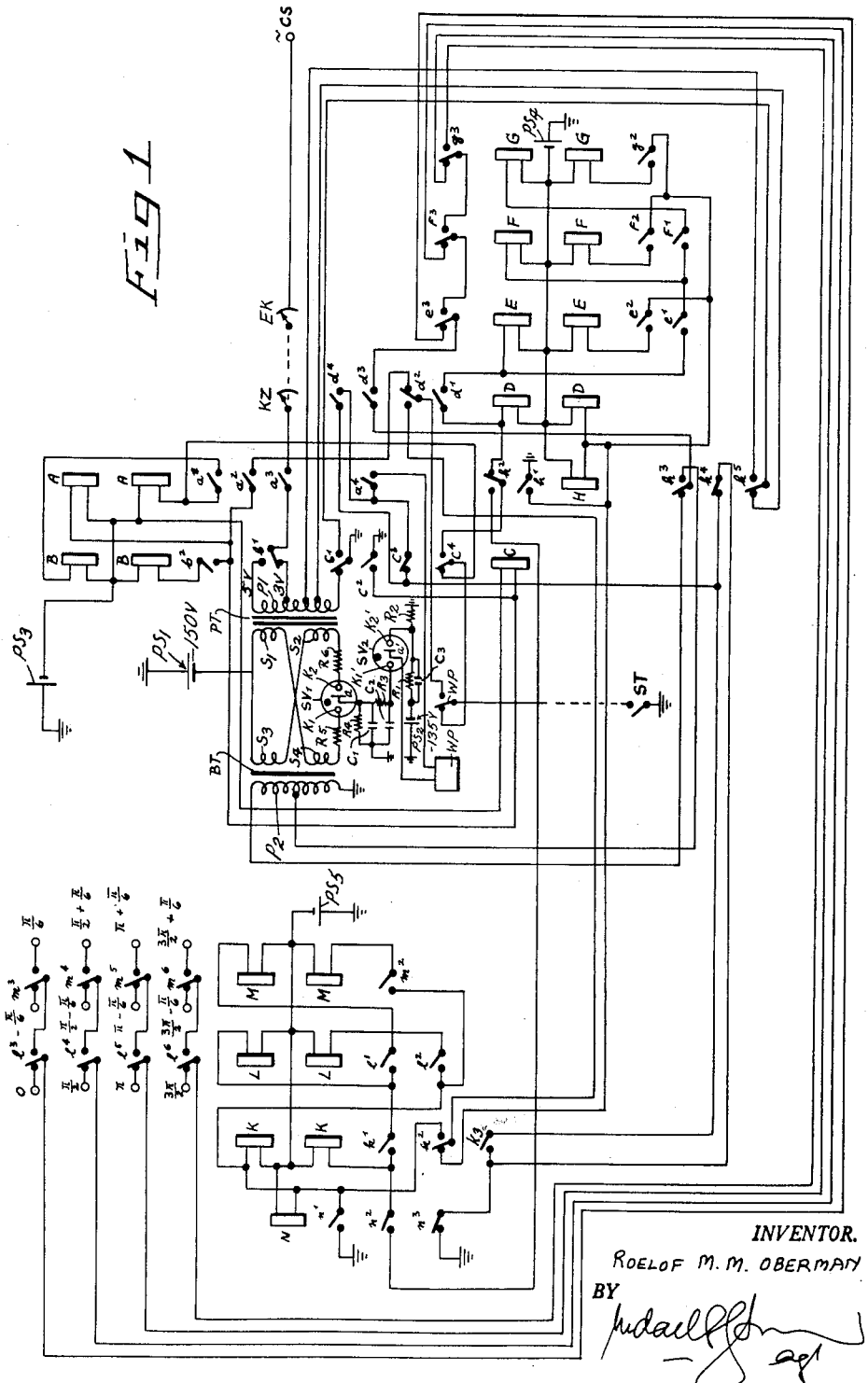
INVENTOR.
ROELOF M. M. OBERMAN
BY Feb. 2, 1960 R. M. M. OBERMAN 2,923,883
APPARATUS FOR DETERMINING THE PHASE OF AN A.C. VOLTAGE
WHICH CAN OCCUR IN 12 DIFFERENT PHASES HAVING
CONSECUTIVE SHIFTS OF 30 DEGREES
Filed June 21, 1954 2 Sheets-Sheet 2
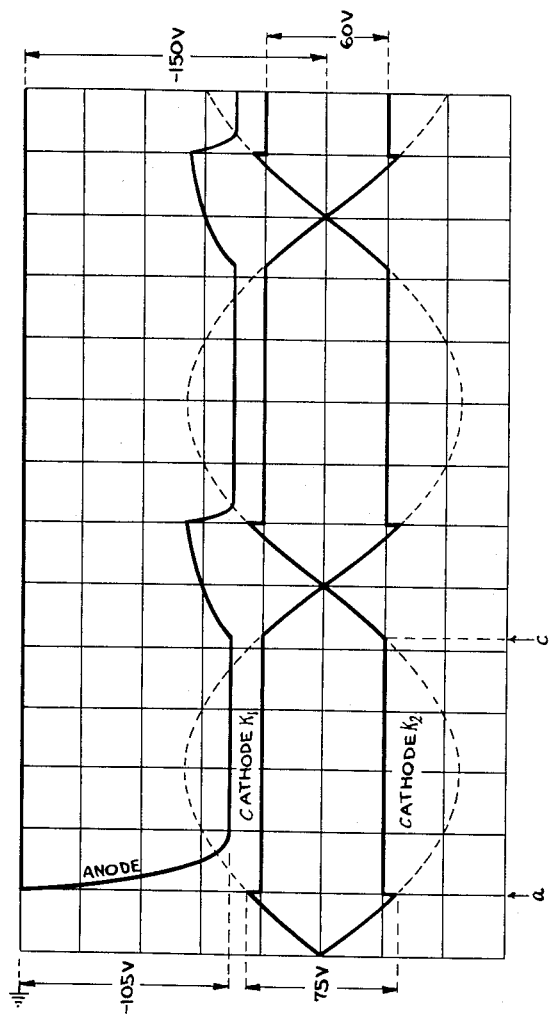
INVENTOR.
ROELOF M. M. OBERMAN
BY

2,923,883

APPARATUS FOR DETERMINING THE PHASE OF AN A.C. VOLTAGE WHICH CAN OCCUR IN 12 DIFFERENT PHASES HAVING CONSECUTIVE SHIFTS OF 30 DEGREES

Roelof M. M. Oberman, Voorburg, Netherlands, assignor to De Staat der Nederlanden, Ten Deze Vertegenwoordigd Door de Directeur-Generaal der Posterijen, Telegrafie en Telefonie, The Hague, Netherlands Application June 21, 1954, Serial No. 438,167

Claims priority, application Netherlands November 11, 1949

2 Claims. (Cl. 324—83)

The present application is a continuation-in-part of my application Serial No. 195,428, filed November 13, 1950, entitled "Device Capable of Determining the Phase of an A.C. Voltage Which Can Occur in 12 Different Phases Having Consecutive Shifts of 30 Degrees," and now abandoned.

The present invention relates to arrangements and methods for rapidly identifying the phase of a voltage.

One of the many objects of the present invention is to provide a device capable of determining the phase of an alternating current voltage. The unknown phase may be any one of twelve different phases, each being consecutively shifted in phase by thirty electrical degrees. Such a device could easily be realized by employing a step by step switch or a relay chain consecutively connecting all possible phases with a testing device to which the phase to be tested is also connected, and which will operate for stopping the step by step switch or the relay chain when phase identity is established. Such a device, however, has the drawback that it is relatively slow operating and requires many component parts for operation thereof.

Another of the many objects of the present invention is to provide a device which utilizes certain characteristics of alternating current voltages, which are mutually shifted in phase by thirty electrical degrees, such device being capable of operating at high speed and requiring but few component parts for operation thereof.

It is well known that the resultant voltage of two added alternating current voltages of equal frequency and equal nominal amplitude, shifted by 180 electrical degrees, is zero. On the other hand, the resultant voltage of two voltages of equal amplitude and separated in phase by plus or minus 150 electrical degrees is about one half E, where E is the amplitude of the voltage to be tested. Through the use of a suitable device it is possible to determine the phase of an unknown voltage by ascertaining whether the voltage resulting from the unknown phase and the comparison phase is above or below one half E. Thus, it is possible to make a discrimination in accordance with the present invention between one of 12 phases of an A.C. voltage and the remaining 11 phases.

The invention is based on the discovery that in an analagous manner a discrimination can be made between a group of three consecutive A.C. voltages as regards phase, and the 9 others by applying to the testing device the counter phase of the middle one of the group of three phases to be ascertained.

The resultant voltage is obtained by adding a voltage of a known phase, or comparison phase, to a voltage of one of the three phases tested for ranges from 0 to approximately one half E, where E indicates the amplitude of all the A.C. voltages to be compared. The voltage resulting from the comparison phase and any one of the 9 other phases amounts to at least E and at most 2E. Hence the discrimination limit in this case lies between ½E and E, or at about ¾E.

The testing device according to the present invention has two parts for performing the phase test in two stages, respectively. The first stage serves to determine whether the tested phase belongs to the triad of which phase 0 is the middle, or of the ones of which $$\frac{\pi}{2}, \frac{3\pi}{2}$$

or $\pi$ are the middle. In the first stage, therefore, first comparison voltages having a principal phase interval equal to 90 electrical degrees are connected to a comparator, or phase discriminator device for determining the unknown phase within broad discriminating limits. In the second stage is determined whether the unknown phase coincides with the central phase or with one of its associated phases, namely $$\pm \frac{\pi}{6}$$

In furtherance of this mode of operation the testing device is provided with an arrangement which applies in consecutive order the principal phases 0, $$\frac{\pi}{2}, \pi, \text{ and } \frac{3\pi}{2}$$

as comparison phases to a discriminating device which serves to stop the aforementioned arrangement when a principal phase is reached which has the desired phase relationship to the three phase group to which the unknown phase belongs, namely when the phase relation is such that the principal phase is 180° out of phase to the middle phase of the 3 phase group to which the unknown phase belongs. Since the comparison phase is compared with each one of the nine other phases in this case, the discrimination voltage in this test will be ¾E.

After the first stage of operation of the discriminating device, the second stage of the testing device is started. In the second stage of the testing device a second part of the latter serves to consecutively apply as a comparative phase to the discriminating device, the principal phase ascertained in the first stage of the test, and in addition, phases shifted with respect to the principal phase by $$\pm \frac{\pi}{6}$$

radians. In the second stage of operation, the discrimination limit is fixed at ¼E. The second part of the test device, comprises a plurality of relays which are stopped by the discriminating device when the required phase is applied thereto.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a phase and voltage testing device, in accordance with the invention; and Fig. 2 shows curves for explaining the operation of gaseous discharge tubes SV₁ and SV₂ of Fig. 1.

In Fig. 1 and in the following description thereof "relay" means a relay including the pertaining contacts or armatures, the winding or coil of the relay being designated by a capital letter (or group) and the pertaining contacts or armatures by the corresponding small letter (or group), a raised numeral being added for the purpose of identification. All relay contacts are shown in their respective positions of rest as occupied when the relay coil is not energized.

Referring to Fig. 1, the phase discriminator comprises the transformers PT and BT, wherein PT is a transformer having a primary winding $P_1$, provided with three tappings and two separate secondary windings $S_1$ and $S_2$, respectively.

BT is a transformer having a primary winding $P_2$ provided with one tapping and two separate secondary windings $S_3$, $S_4$, respectively.

The voltage having the phase to be tested and the comparing voltage are applied to the primary windings $P_1$ and $P_2$, respectively.

The secondary windings $S_1$, $S_2$, $S_3$ and $S_4$ are connected in such a manner that the voltages to be compared which are applied respectively to the primary windings, may be added to each other, whereupon the resulting voltage can serve to control a switching device. Said switching device comprises two cold cathode tubes, having each two cathodes, of which the tube $SV_1$ with cathodes $K_1$, $K_2$ and anode $a$ is ignited as long as a phase opposition between the applied voltages to be compared is not present, while under this condition the cold cathode tube $SV_2$ with cathodes $K_1'$, $K_2'$ and anode $a'$, is extinguished. As soon as a phase opposition between the applied voltages to be compared occurs, $SV_2$ is ignited and $SV_1$ extinguished. $SV_2$ can only be extinguished if the anode circuit of $SV_2$ is opened during a short time.

$R_5$ and $R_6$ are high resistors which are connected between the electrodes of the tube $SV_1$ and the windings $S_4$ and $S_2$ of the transformers BT and PT, respectively, and prevent the glow discharge which may occur in the tube $SV_1$ from passing into an independent arc.

$R_2$ is a resistor connected between the cathode $K_2$, of the tube $SV_2$ and ground.

$R_1$ is a resistor connected between the same cathode $K_2$, of the tube $SV_2$ and a battery $PS_2$, but in parallel with a capacity $C_3$.

The testing device shown in Fig. 1 is a combined device for amplitude and phase testing. Where several voltages of different amplitudes are used, and where each voltage may be shifted in phase with respect to others by 30 electrical degrees, it is advantageous to precede the phase test by an amplitude test. With the output of the above described switching device connected, as stated above the relay coil WP which may be energized by the 135 volt battery $PS_2$ through the switching operation of the tube $SV_2$, and is adapted to actuate a change-over switch $wp$ which is transferred from the position shown to its second position whenever the tube $SV_2$ responds.

D, E, F, G and H are the coils of relays which form the first portion of the testing device, which part may differentiate between a group of 3 phases and 9 other phases if 12 voltages are used having equal amplitudes and different given phases. Said part of the testing device may, if required, successively shift the contacts $e^3$—$g^3$ from the illustrated to the opposite position as a result of which successively the 4 groups of 3 comparing phases may be connected with the primary winding $P_2$ of the transformer BT.

The relays and the corresponding contacts of said portion of the testing device are:

D—relay with the contacts: $d^1$, $d^2$, $d^3$, $d^4$.
E—relay with the contacts: $e^1$, $e^2$, $e^3$.
F—relay with the contacts: $f^1$, $f^2$, $f^3$.
G—relay with the contacts: $g^2$, $g^3$.
H—relay with the contacts: $h^1$, $h^2$, $h^3$, $h^4$, $h^5$.

If, for instance, by means of the first portion of the testing device that group of 3 phases is found to which the unknown phase belongs, then the device is switched in such a manner that now it is capable of differentiating between one phase and all the remaining phases. Said switching occurs when relay coil H is energized so that the contact $H^2$ connects the contact $wp$ via contact $C^4$ with the second part of the testing device and $h^3$ and $h^5$ are shifted to establish a circuit with tappings of the windings $P_2$ and $P_1$, respectively.

Said second portion of the testing device is formed by the relays K–N.

K—relay with the contacts: $k^1$, $k^2$, $k^3$.
L—relay with the contacts: $l^1$, $l^2$, $l^3$, $l^4$, $l^5$, $l^6$.
M—relay with the contacts: $m^1$, $m^2$, $m^3$, $m^4$, $m^5$, $m^6$.
N—relay with the contacts: $n^1$, $n^2$, $n^3$.

Consequently by means of said second portion the unknown phase is successively compared with the phases belonging to the group which was found during the first test until the unknown phase and the comparing phase coincide, as a result of which relay N fixes the found setting by means of the contact $n^1$, and the desired phase has been found.

$St$ is a manually operated switch by means of which the device may be put into service.

A is a relay wtih the contacts $a^1$, $a^2$, $a^3$, $a^4$.
B is a relay with the contacts $b^1$, $b^2$.
C is a relay with the contacts $c^1$, $c^2$, $c^3$, $c^4$.

$cs$ is the connecting point for the voltage having the unknown phase.

EK is a final selector.
KZ is a chord finder.
$PS_3$ is a battery by means of which the relays A—C may be energized.
$PS_4$ is a battery by means of which the relays D—H may be energized.
$PS_5$ is a battery by means of which the relays K—N may be energized.

The voltages to be compared are added by means of the secondary windings $S_1$—$S_4$ of transformers BT and PT, respectively, and applied to the interchangeable cathode and control electrode of the cold cathode tube, $SV_1$. This tube is filled with a gas, in known manner, so that a glow discharge will take place therein when the voltage between the cathode and the control electrode exceeds a predetermined value. The high resistances $R_5$, $R_6$ prevent the discharge from passing into an independent arc. Each time the voltage between the cathode and the control electrode goes below a critical value, the tube glow is extinguished. In the normal operating condition of the arrangement, that is when there is no phase equality between the voltages to be compared, the tube $SV_1$ is ignited, while tube $SV_2$, which is also gas filled, is extinguished. At phase equality the voltage difference between the cathode and the control electrode of tube $SV_1$ drops permanently below the ignition voltage. The discharge in the main path is therefore also extinguished. At this point the anode voltage of tube $SV_1$ will now be slightly negative so that tube $SV_2$ ignites.

The operation of tube $SV_1$ is diagrammatically shown in Fig. 2, the tube $SV_1$, as well as tube $SV_2$, having three electrodes, namely two cathodes $K_2$, $K_1$; $K_1'$, $K_2'$ and one anode $a$; $a'$, respectively. The burning voltage between the two cathodes is lower than between the anode and one of the cathodes. If a voltage exists between the anode and one of the cathodes which is lower than the ignition value, but higher than the burning value, no current will flow in the anode circuit, which is the main path. The electrode voltages for $SV_1$, and $SV_2$, being substantially equal may be, for example:

|   | V. |
|---|---|
| Ignition voltage between cathodes | 75 |
| Burning voltage between cathodes | 60 |
| Ignition voltage between cathode and anode | 175 |
| Burning voltage between cathode and anode | 75 |

For purposes of explaining the operation of tube $SV_1$, voltages displaced in phase by 180° have been selected. The two similar cathodes $K_1'$ and $K_2'$ of tube $SV_2$ receive voltages also represented by the curves indicated as cathode $K_1$ and $K_2$. When the voltage between cathode $K_1'$ and cathode $K_2'$ is 75 volts, a discharge is set up. The ignition voltage point between the cathodes is represented at $a$ of Fig. 2. Since the two cathodes are also connected to the minus pole of a 150 volt battery $PS_1$, the voltages between the cathodes and the anode will now be −120 volts and −180 volts, respectively, so that the anode ignites with one of the cathodes and thereafter the anode voltage immediately becomes 75 volts, which is the burning voltage. The anode potential falls in consequence from 0 to −105 volts with which the voltage condensers $C_1$ and $C_2$ are charged.

Every half period of the alternating voltage, the potential difference between the cathodes is momentarily forced below the burning voltage, shown at point $c$ on Fig. 2. It can be seen that the tube $SV_1$ will be in ignited condition or not, depending upon the amplitudes of the applied alternating voltage.

$C_1$ and $C_2$ are capacitors which form an integrating network in conjunction with a resistor $R_3$ so that during the periodical extinction of the tube $SV_1$, the anode potential of the tube $SV_1$ cannot decrease immediately to ground potential. The variation of the anode potential of the tube $SV_1$ in relation to time is shown in Fig. 2.

When the tube $SV_1$ is ignited, because the voltage of the anode $a$ of the tube $SV_1$ may be decreased from 0 to −105 v. (vide Fig. 2), the condensers $C_1$ and $C_2$ may be charged for instance to −105 v. relative to ground. If the tube $SV_1$ is extinguished for a longer duration, then the condensers $C_1$ and $C_2$ may discharge across a resistor $R_4$ and, as a result, the voltage across the condensers $C_1$ and $C_2$ may be varied from −105 v. to 0 v. Said potential variation may also be followed by the cathode $K_1'$ of the tube $SV_2$.

$PS_2$ is a battery which applies a potential of −135 v. relative to ground to the cathode $K_2'$ of the tube $SV_2$. If owing to the discharge of the condensers $C_1$ and $C_2$ the potential of the cathode $K_1'$ of the tube $SV_2$ changes from −105 v. to 0 v. at a certain moment, the potential difference between the cathodes $K_1'$ and $K_2'$ will reach the ignition value (75 v.) so that the tube $SV_2$ can ignite between the cathodes $K_1'$ and $K_2'$ whereupon the ignition between the cathode $K_2'$ and the anode $a'$ of the tube $SV_2$ can also occur. Now the relay coil WP may be energized in a circuit from ground, battery $PS_2$, resistor $R_1$, cathode $K_2'$, anode $a'$, coil of relay WP, closed contact $a^4$, closed contact $c^3$, closed contact $h^4$, closed contact $n^3$, ground.

$$0, -\frac{\pi}{6}, +\frac{\pi}{6}$$

$$\frac{\pi}{2}, \frac{\pi}{2}-\frac{\pi}{6}, \frac{\pi}{2}+\frac{\pi}{6}$$

$$\pi, \pi-\frac{\pi}{6}, \pi+\frac{\pi}{6}$$

$$\frac{3\pi}{2}, \frac{3\pi}{2}-\frac{\pi}{6}, \frac{3\pi}{2}, +\frac{\pi}{6}$$

are the 4 groups of 3 phases forming the 12 voltages used for comparison with the given phases and appearing at the terminals so marked in the upper left portion of Fig. 1.

When the contact $St$ is closed the alternating voltages to be tested are applied to the right hand primary winding $P_1$ of the transformer PT and the left hand primary winding $P_2$ of the transformer BT via contacts $d^3$ and $a^3$, respectively. For, when the contact $St$ closes, relay D is enrgized in a circuit via contact $wp$ in illustrated position, contact $c^4$ of relay C in position opposite to the illustrated one, energized in a manner still to be described, and contact $h^2$ in the position shown.

Contact $a^3$ applies the voltage to be tested to the primary winding $P_1$ of transformer PT via contact $b_1$, contact $d^3$ applies, coil D being energized, a comparison voltage via the contact group $e^3$, $f^3$, $g^3$ and $h^3$ to the primary winding $P_2$ of transformer BT. Further contact $d^4$ in the anode circuit of the tube $SV_2$ is now closed. Contact $a^3$ has been closed before contact $d^4$ because as a result of the preceding amplitude test the relays A and C, and possibly also B, are energized and locked by contact $C^2$. Via contact $d^1$ the first portion of the testing device comprising the relays D—H is connected with the contact $wp$. The voltages to be compared are summed by means of the secondary windings of the transformers BT and PT and applied to the electrodes of the tube $SV_1$. Said tube is gas filled and a glow discharge occurs therein if the voltage between said electrodes exceeds a certain value. The high resistances $R_5$, $R_6$ prevent the discharge from developing into an independent arc. Each time when said voltage decreases below said certain value, the tube is extinguished. As long as there is no phase opposition between the applied voltages to be compared, the tube $SV_1$ decreases below the ignition voltage. Thereby the discharge in the main path is extinguished. Then the anode voltage of the tube $SV_1$ becomes less negative in such a manner that the tube $SV_2$ ignites.

The relay coil WP in the anode circuit of the tube $SV_2$ attracts the armature $wp$, when said tube ignites. If the phase opposition of the voltage to be compared is again disturbed, the tube $SV_1$ ignites, but the tube $SV_2$ is only extinguished if the anode circuit is opened during a short time. Only then the initial or rest condition of the device is restored. For understanding the operation of the testing device it must be taken into account that the attraction times of the relays D—H are in the order of 10 millisec., while the operation time of the device, when a phase opposition is present (until the attraction of the armature of relay WP) may be set at about 2 millisec. The relays D—H are not able to attract their armatures, if they would be energized during 2 milliseconds only.

Relay D is energized via $c^4$ in position opposite to that shown, and $h^2$ in shown position when the armature $wp$ of test relay WP is in its shown position, which is the normal operating position of the testing device. Upon closure of contact $d^3$ the phase 0 of the comparison voltage is connected with the primary winding $P_2$ of the transformer BT via the contacts $e^3$ and $f^3$ which are in the positions shown. Now the device is set in such a manner by means of a tapping on the primary winding $p_2$ of transformer BT that the operation limit lies at phases $$\pi \pm \frac{\pi}{4}$$

that is to say that the device will become operative if the phase to be tested is $$\pi, \pi+\frac{\pi}{6} \text{ or } \pi-\frac{\pi}{6}$$

while for all the other phases from the group of 12 phases the device remains in the condition of rest. This means that the operation group must be set in such a manner that the device only responds if the amplitude of the resulting voltage is equal to or smaller than half the value of the amplitudes of the voltages to be compared.

At the beginning of the operation there are two possibilities namely: either the phase found belongs to the group of three, which render the discriminating portion of the device operative or it does not. In the latter case the relay E will be able to attract its armatures or contacts $e^1$, $e^2$, $e^3$, coil E being in a circuit from ground via the contacts $St$, $wp$, $c^4$, $h^2$ and $d^1$, coil E and battery $PS_4$. Via the contact $e^3$ moved to the position opposite to that shown the comparison phase $$\frac{\pi}{2}$$

is now switched on. If it does not yet belong to the group of the phase to be tested, the relay coil F energized via $d^1$, $e^1$ will be able to attract its armatures or contacts $f^1$, $f^2$, $f^3$. Relay G operates analogously in relation to phases $\pi$ and $3/2\pi$. If one of the relays D—G switches on the comparison phase which belongs to the voltage to be tested, the discriminating portion of the device is rendered operative. Then the relay coil WP attracts the armature and interrupts via the contact wp in its alternate position the circuit via $c^4$, $h^2$ serving for switching on the relays D—G, while via the contact $h^1$ a locking circuit is closed for the relays D—G in as far as they were already energized, because during above operations a circuit for relay H was closed, which completes by means of the contact $h^1$ and holding contacts $e^2$, $f^2$, $g^2$ locking circuits for the relays D—G, respectively, whenever one of said relays has attracted its armatures. Contacts $h^3$ and $h^5$ switch the device in such a manner that now it will be able to differentiate between one certain phase and all the other phases and no longer between a group of three and all nine other phases as first was the case. Contact $h^4$ interrupts the anode circuit ground, $n^3$, $d^4$, $a^4$, WP, $a'$, $K_2'$, $R_1$, $PS_2$, ground of the tube $SV_2$ which circuit is only restored as soon as relay K responds so as to close $K_3$. The tube $SV_2$ extinguishes and remains extinguished in the following stage of the test, if the phase to be tested does not correspond with the applied comparing phase.

By means of contact $h^2$ moved to the position opposite that shown the contact wp is connected with the second portion of the testing device i.e., relays K—N, which is constructed in the same manner as the first portion comprising relays D—H, however, it comprises less relays. After as a result of the energization of relay H in the first portion of the testing device, the tube $SV_2$ is extinguished upon opening of contact $h^4$ and contact wp is again transferred to the shown position, relay K in the second portion of the testing device is energized via $c^4$, $h^2$ (in moved positions) and $n^2$ by $PS_5$. Said relay remains energized in a locking circuit via holding contact $k^2$ and the contact wp (in its alternate position not shown), if it appears that the applied comparison phase is the phase sought. If this is not the case, after relay K also relay L (via $k^1$) and if necessary relay M (via $l^1$) respond, but in any case relay K remains energized. If the comparison phase still differs $$+ \text{ or } -\frac{\pi}{6}$$

from the phase sought, relay L is energized in a circuit from ground via contacts $St$, wp, $c^4$, $h^2$ (in the alternate position), $n^2$, $k^1$ to the winding of relay L and to battery $PS_5$. Via one of the contacts $l^3$–$l^6$ and the entire circuit or a portion of the circuit via contacts $d^3$, and $e^3$, $f^3$ and $g^3$ (in as far as the relays D—G could be energized in the first portion of the test) a phase leading 30° with respect to the last phase used in the first portion of the test is connected with the phase discriminating portion of the device. If said phase would not yet be the correct one, the relay coil M still attracts its armature. If the correct comparison phase is switched on, then the tube $SV_1$ extinguishes and the tube $SV_2$ ignites; relay coil WP attracts its armature wp and moves it to its alternate, not shown position. Thereby a circuit is established for the winding of the relay N via the contacts $d^2$ and $k^2$ in their alternate positions. Said winding attracts its armature and closes via contact $n^1$ a locking circuit for itself so that the setting found is fixed. The contact $n^2$ is moved to open position and thus prevents a further energization of the relay circuits K—M. The desired phase has been found.

The device described above cannot only be used to determine for instance the phase in a register which is connected with a certain contact of a set selector, such as for instance shown in the drawing Fig. 1. The device may be used in all those cases wherein a characterizing property is allotted to the phase of an alternating current which must be determined, such as for instance may be the case when selecting criteria are transmitted by means of phases of an alternating voltage.

The device described above uses a selection from 12 phases of alternating voltages of equal amplitude. If for instance two series of alternating voltages having 12 phases are present having respectively different amplitudes such as 3 and 5 v., then for the amplitude test the transformer PT is provided with a tapping marked 3V and a terminal marked 5V, which are provided in such a manner that if an alternating voltage of 4 v. is applied to the terminal 3V, the ignition voltage of the tube $SV_1$ is just attained. A voltage of 3 v. having any phase, will not be able to ignite the tube $SV_1$ while a voltage having an amplitude of 4 v. and any phase will always be able to ignite the tube $SV_1$.

When the test is to be started, contact $St$ is closed so that an energization circuit for relay A is established via the contact $c^4$ and contact wp in the positions illustrated. Ground potential is applied to the anode $a'$ of the tube $SV_2$ via the contacts $n^3$, $c^3$, $n^4$, $a^4$ and coil WP so that potential differences may be produced between the anode and the cathodes $K_1'$ and $K_2'$.

The relays A and B have an operation time of about 10 millisec., while the phase discriminating portion of the device has an operation time of about 2 millisec; if a voltage from the 5 v. series is tested, the relay B will be able to attract its armature after the energization of the relay A due to closing of contact $a^1$. The contact $b^1$ then effects a switching-over of the input into the primary winding $P_1$ of the transformer PT. The voltage from the 5 v. series connected to the 5 v. terminal of the transformer PT is not sufficient to maintain the tube $SV_1$ ignited. Said tube extinguishes so that the tube $SV_2$ is ignited. The relay coil wp attracts its armature, contact wp is shifted from the position shown to its alternate position so that an energization circuit for the relay coil C via $d^2$, $a^2$ to $PS_3$ is established. Contact $c^2$ closes a locking circuit for the relay coil C, while contact $c^1$ switches in the correct manner the primary winding $P_1$ of the transformer PT for the following test, if any, of the voltage.

Would there have been a 3 v. voltage, then immediately after the armature of relay A has been attracted by the relay coil A, the relay WP would have become operative. Bypassing relay B an energization circuit for the relay C would have been formed.

To initiate the test relay contact $St$ is closed, establishing an energizing circuit for relay A via the back side of contact wp. Via the make sides of contact $a^3$ the voltage to be tested is applied to the discriminating device. Contact $a^4$ switches in the anode voltage of tube $SV_2$, which cannot ignite then if an A.C. voltage of the 5 v. series is applied to the discriminator.

The relays A and B have an operating time of about 10 milliseconds, the discriminating set having an operating time of about 2 milliseconds, the relays A and B will not operate by a 2 millisecond energization. In case a voltage of the 5 v. series is tested, relay B will have the opportunity to operate after relay A. Contact $b^1$ is turned over. The voltage of the 5 v. series, applied to the 5 v. tap on the transformer PT is not sufficient to keep tube $SV_1$ ignited. This tube is extinguished, so that tube $SV_2$ is ignited. Relay WP attracts its armature; contact wp, turned over, establishes a circuit for delay C.

Contact $c^2$ closes a holding circuit for relay C. Contact $c^1$ connects the primary of transformer PT in the right way in view of a contingent next test of the voltage.

If a 3 v. voltage had been present, relay WP would have been energized immediately after relay A attracting its armature. In that case an energizing circuit would have been closed for relay C, relay B being passed over.

According to Fig. 1 the voltage amplitude test is carried out first, followed by the phase test, notably, considering the lower part of the figure, in the upper, the middle and the lower relay chain, respectively.

An important application of the invention is a P.B.X connection, the unknown phase being that of a starting line. It is recorded as regards amplitude and value in the positions of the armatures of relays B, E, F, G, L and M. If the selector, after having stopped at the starting line which has been found occupied is started again to search a free P.B.X line, the phase found at transformer BT serves as comparison voltage in the searching movement, which follows now. All the intermediate lines have the same characteristic phase as the starting line. If a line is found, having this phase, and if it is tested free in a well-known way, not further indicated, relay WP, then energized, stops the selector.

Relay C may be combined with relay D; relays H and K could be combined as well. Taking into account the long extinguishing time of the cold cathode tube $SV_2$, however, it is safer to keep these relays separated.

There are a number of other variations possible on the device according to Fig. 1. If e.g. the relays K and L should be fitted with only few contacts it is possible to provide a group of scanning relays for each group of three phases. Furthermore a relay chain can be replaced of course by a step by step switch, which is stopped when the correct phase or group of phase is found.

What I claim is:

1. An arrangement for rapidly determining the phase of a selected A.C. voltage present in an $n$-phase system containing $n$ voltages having $n$ phases, respectively, of known phase relationships, said $n$ voltages being divided into $p$ groups which each consist of $q$ voltages, the phase range covered by each of said groups amounting at the utmost to $$\frac{2\pi}{m}$$

radians wherein $m$ is an integer larger than 2 and an aliquot part of $n$, comprising, in combination, a voltage discriminator circuit adapted to be connected to said selected voltage whose phase is to be determined, as well as alternatively to any one of said $n$ voltages, and including electronic means, sensitive to phase intervals between said selected voltage and any one of said $n$ voltages, for establishing predetermined control voltages depending upon a predetermined one of said phase intervals, and relay means operated by said electronic means; a switching device having $p$ groups of $q$ terminals for being connected to said $n$ voltages, and being in circuit with said voltage discriminator for being operated thereby; a first testing device connected to said electronic means for being actuated thereby and in circuit with said switching device for controlling the latter and for sequentially connecting one primary voltage out of each of said $p$ groups of voltages to said voltage discriminator so that, when during said sequentially connecting operation the condition is met that any one of said primary voltages out of said $p$ groups has the counter phase to that of said selected voltage, said electronic means establish one of said predetermined control voltages; a second testing device connected to said electronic means for being actuated thereby and said switching device, for controlling the latter and for sequentially connecting the $q$ voltages out of any one of said $p$ groups of voltages to said voltage discriminator, said second testing device being actuated by said relay means operated by said electronic means when said one of said predetermined control voltages is established, and means for restricting said connecting operation of said second testing device to the $q$ voltages of that identified one of said $p$ groups of primary voltages which contains the voltage that has the counter phase to that of said selected voltage, so that, when during said sequentially connecting operation of said second testing device the condition is met that one of said $q$ voltages of said identified group has the counter phase to that of said selected voltage, said electronic means establish another one of said predetermined control voltages for terminating the operation of said switching device whereby the phase of said selected voltage is identified by comparison with that one of said $n$ voltages whose phase is the counter phase of that of the selected voltage.

2. An arrangement according to claim 1 wherein the number of phases of voltages of the $n$ phase system amounts to twelve, and wherein said twelve voltages are divided into four groups each comprising three voltages while the phase range covered by each of said groups amounts to $$\frac{2\pi}{6}$$

radians, said switching device comprising a number of switching elements ($d^3$, $e^3$, $f^3$, $g^3$; $h^3$, $h^5$; $f^3$–$f^6$, $m^3$–$m^6$) which are interconnected in a two-dimensional relationship, while said voltage discriminating device is provided with such tappings that a threshold voltage applied to said electronic means by means of said switching elements ($h^3$, $h^5$) can be switched over from a value, which lies between half the value and the whole value of the amplitude of said selected voltage, to a value lying between half the value of said amplitude and zero.

References Cited in the file of this patent

UNITED STATES PATENTS

| | | |
|---|---|---|
| 1,495,466 | Wente | May 27, 1924 |
| 2,490,833 | Ransom | Dec. 13, 1949 |
| 2,527,096 | Howes | Oct. 24, 1950 |
| 2,557,581 | Triman | June 19, 1951 |
| 2,625,589 | Haughton | Jan. 13, 1953 |
| 2,806,185 | Oberman | Sept. 10, 1957 |

FOREIGN PATENTS

| | | |
|---|---|---|
| 308,369 | Italy | 1933 |